United States Patent
Rapp (10) Patent No.: US 10,031,963 B2
(45) Date of Patent: *Jul. 24, 2018

(54) METHODS, SYSTEMS, AND SOFTWARE APPLICATIONS FOR EVENT BASED DATA PROCESSING

(71) Applicant: SAP SE, Walldorf (DE)

(72) Inventor: Roman Rapp, Antibes (FR)

(73) Assignee: SAP SE, Walldorf (DE)

( * ) Notice: Subject to any disclaimer, the term of this patent is extended or adjusted under 35 U.S.C. 154(b) by 1257 days.

This patent is subject to a terminal disclaimer.

(21) Appl. No.: 13/857,933

(22) Filed: Apr. 5, 2013

(65) Prior Publication Data

US 2013/0226861 A1      Aug. 29, 2013

Related U.S. Application Data (63) Continuation of application No. 12/786,753, filed on May 25, 2010, now Pat. No. 8,417,732, which is a (Continued)

(30) Foreign Application Priority Data

Feb. 4, 2004   (EP) .................................... 04002433

(51) Int. Cl.
  *G06F 7/00*  (2006.01)
  *G06F 17/30*  (2006.01)
  *G06F 9/46*  (2006.01)

(52) U.S. Cl.
  CPC .......... *G06F 17/30592* (2013.01); *G06F 9/46* (2013.01); *Y10S 707/944* (2013.01)

(58) Field of Classification Search
  CPC ......... G06F 17/30575; G06F 17/30371; G06F 17/30557; G06F 17/30607;
  (Continued)

(56) References Cited

U.S. PATENT DOCUMENTS 5,546,564 A * 8/1996 Horie ...................... G06F 17/18
                                                434/108
5,596,752 A * 1/1997 Knudsen ................... G06F 8/31
                                                707/E17.038

(Continued)

FOREIGN PATENT DOCUMENTS

EP     1 081 665     3/2001
FR     2 625 343     6/1989

OTHER PUBLICATIONS

EPO Search Report, dated Apr. 21, 2004, for EP 04002433, 3 pages.

(Continued)

*Primary Examiner* — Daniel Kuddus
(74) *Attorney, Agent, or Firm* — Brake Hughes Bellerman LLP (57) ABSTRACT

Methods and systems are provided for processing data objects in a computer system. In one embodiment, a method is provided that comprises (a) storing a first data object in a database in a non volatile storage, (b) creating a second data object assigned to the first data object, step (b) being triggered by step (a), and (c) processing the second data object by means of an object processor, the object processor creating a third data object using data contained in the second data object, data contained in the first data object and data contained in the database by applying a set of one or more pre-settable rules to the data contained in the first and second data objects and in the database.

20 Claims, 6 Drawing Sheets

Related U.S. Application Data continuation of application No. 11/049,670, filed on Feb. 4, 2005, now Pat. No. 7,752,228.

(58) Field of Classification Search
CPC .............. G06F 17/30292; G06Q 10/10; G06Q 21/6218; G06Q 9/546
See application file for complete search history.

(56) References Cited

U.S. PATENT DOCUMENTS

| | | | |
|---|---|---|---|
| 6,308,166 B1 | 10/2001 | Breuker et al. | |
| 6,615,218 B2 | 9/2003 | Mandal et al. | |
| 6,941,184 B2* | 9/2005 | Ebert | G06Q 10/08 700/115 |
| 7,085,735 B1* | 8/2006 | Hall | G06Q 10/00 705/38 |
| 7,353,212 B1 | 4/2008 | Darcy et al. | |
| 7,385,678 B2* | 6/2008 | Dams | G03B 27/58 310/12.06 |
| 7,386,578 B2* | 6/2008 | Fuerst | G06F 17/30557 |
| 7,464,091 B2* | 12/2008 | Conrad | G06F 17/30575 |
| 7,505,983 B2* | 3/2009 | Wildhagen | G06F 8/10 707/758 |
| 7,516,137 B1 | 4/2009 | Earle et al. | |
| 7,529,688 B2 | 5/2009 | Prakash | |
| 7,752,228 B2 | 7/2010 | Rapp | |
| 2002/0138571 A1 | 9/2002 | Trinon et al. | |
| 2003/0132853 A1* | 7/2003 | Ebert | G06Q 10/08 340/4.3 |
| 2004/0148589 A1* | 7/2004 | Conrad | G06F 17/30575 717/116 |
| 2005/0027683 A1 | 2/2005 | Dill et al. | |
| 2005/0060275 A1* | 3/2005 | Steuernagel | G06F 17/30371 |
| 2005/0069103 A1 | 3/2005 | DiVenuta et al. | |
| 2005/0120010 A1 | 6/2005 | Philpott et al. | |
| 2005/0155037 A1* | 7/2005 | Klein | G06F 9/465 719/310 |
| 2006/0059107 A1 | 3/2006 | Elmore et al. | |
| 2006/0101096 A1* | 5/2006 | Fuerst | G06F 17/30557 |
| 2010/0235398 A1 | 9/2010 | Rapp | |

OTHER PUBLICATIONS

European Patent Office (EPO) Communication, dated May 24, 2004, for EP 04002433, 10 pages.

PCT International Search Report and Written Opinion, dated Sep. 28, 2005, for PCT/EP2005/050391, 10 pages.

* cited by examiner

METHODS, SYSTEMS, AND SOFTWARE APPLICATIONS FOR EVENT BASED DATA PROCESSING

RELATED APPLICATIONS

This application is a continuation of U.S. application Ser. No. 12/786,753 (now allowed), filed on May 25, 2010, which is a continuation of U.S. application Ser. No. 11/049,670, filed on Feb. 4, 2005 (now U.S. Pat. No. 7,752,228), and claims priority to European Patent Application No. 04002433.3, filed on Feb. 4, 2004, the disclosures of which are expressly incorporated herein by reference to their entireties.

BACKGROUND

Technical Field

The present invention generally relates to the area of electronic data processing. More particularly, embodiments of the invention relate to methods, computer program products, and systems for event based data processing.

Background Information

Data processing is commonly used for various purposes, such as screening computer systems or networks for files potentially containing dangerous code like viruses, trojans, diallers, and the like. Such screening is usually done periodically, such as every day, week or month. In practice, there is a limited time in which screening and analyzing of the data objects must be finished. This restricts the run-time of all tasks that can be performed due to hardware restrictions and thus the level of detailed analysis of the files. This may result in an decrease of the security of the computer system or network.

A further example of data processing in the field of cost accounting includes cost allocation and bookkeeping in the computerized administration and management of enterprises. An example of such data processing is known from the document, U.S. Pat. No. 6,308,166 B1, the disclosure of which is expressly incorporated herein by reference in its entirety. The document discloses a process template to enhance the evaluation and control of an organization's costs, utilizing three layers. The first layer provides a user interface that accepts language-dependent function names and descriptions utilizing different editors for cells within the template. The second layer utilizes a parser to check the syntax of the functions and create control blocks that are internal representations of the functions. The third layer handles the physical storage of the template and generates an executable report.

A flexible link to different cost objects is created so that an evaluation within different costing applications may occur. As sender objects and quantities are determined during the evaluation, a sophisticated, demand-driven cost assignment from a receiver point of view occurs.

The disclosed template may be used in enterprises for the assignment of overhead costs, which are caused by certain events in the enterprise (e.g., performing a purchase, material movement etc.).

Such costing is usually done as a period-end closing activity. In practice, there is a limited time in which the period-end report for costing data must be finished (e.g., in general, about 3-5 days after period end). This restricts the run-time of all tasks that can be performed due to hardware restrictions and, thus, the level of detail with which the costing can be done, since with increasing accuracy of costing more and more data must be processed. Thus, many companies have to limit their costing to less detailed information; although from a business point of view, they would need more details. For example, they stick to assessments, although they would need an exact activity and/or resource based consumption accounting.

In some software solutions for production processes, there is a confirmation business transaction that adopts the aspect of immediately handling costing information. But, it still requires manual input and only relates to direct production costs. Overhead costs in an enterprise are either also entered manually (e.g., activity reporting per employee) or handled at the period end using data from underlying business transactions.

Thus, there is a need for methods, software applications, and/or data processing systems providing a more efficient solution that addresses at least one or more of the problems described above. Moreover, it is desirable to provide a software application having a mechanism for processing data objects more efficiently.

The above description is based on the knowledge of the present inventors and not necessarily that known in the art.

SUMMARY

In accordance with embodiments of the invention, as embodied and broadly described herein, methods and systems are provided for processing data objects in a computer system or other computerized environment. In one embodiment, a method is provided that comprises: (a) storing a first data object in a database in a non volatile storage; (b) creating a second data object assigned to the first data object, step (b) being triggered by step (a); and (c) processing the second data object by means of an object processor, the object processor creating a third data object using data contained in the second data object, data contained in the first data object and data contained in the database by applying a set of one or more pre-settable rules to the data contained in the first and second data objects and in the database.

According to another embodiment, a computer system is provided for processing data objects, the system comprising: memory having program instructions; input means for receiving and entering data; output means for sending and presenting data; storage means for storing data; and a processor responsive to the program instructions, the program instructions comprising program code means for performing a method of processing data objects in the computer system when the program instructions are executed by the processor. The method may comprise: (a) storing a first data object in a database in a non volatile storage; (b) creating a second data object assigned to the first data object, step b) being triggered by step (a); and (c) processing the second data object by means of an object processor, the object processor creating a third data object using data contained in the second data object, data contained in the first data object, and data contained in the database by applying a set of one or more pre-settable rules to the data contained in the first and second data objects, and in the database.

Methods and systems consistent with the present invention are particularly applicable, but not limited to, computer systems and network environments in which a plurality of files have to be screened.

In accordance with one aspect, embodiments consistent with the present invention may reduce the computing time and memory space for the periodical runs of an enterprise's software and computer system and, thus, increase system performance and availability.

Embodiments consistent with the invention are further applicable to event based costing environments, where it is usable for handling every event, i.e., every business transaction (e.g., entering a purchase order or a material movement) that is relevant for costing immediately. Thus, there is no more need to collect and evaluate all relevant data at the period end. In theory, this immediate handling could be done manually, but one advantage of event based costing according to embodiments of the invention is that it may be performed automatically, triggered by an event in the business transaction without requiring any additional user interaction. This makes a much more detailed costing possible. In one embodiment, the triggering event is preferably the persisting of the first data object, which represents the real world event in the computer system of the enterprise, i.e., the storing of the respective first data object.

As will be appreciated, embodiments consistent with the present invention can also cover all types of costs, not only direct ones. Thus, embodiments consistent with the invention may enable a event based, asynchronous, "near realtime" and very accurate (cause and effect) assignment of costs. Such embodiments may significantly reduce the time for period-end closing in costing. Further, embodiments consistent with the invention may reduce the computing time and memory space for the period-end closing run of an enterprise's business software and computer system and, thus, increase system performance and availability.

Embodiments of the invention are further directed to computer systems, computer programs, and computer readable media including a carrier signal, each comprising program code or instructions of processing data objects in a computer system in which a first data object is stored in a database in a non volatile storage according to, for example, the above-described method and its embodiments.

Computer programs consistent with the present invention can be installed as one or more programs or program modules on different hardware systems (computers or computer systems), and run separately and independently of each other, in their entirety being capable of performing methods and embodiments consistent with the invention. The different systems may be connected in the form of a network to communicate with each other.

Additional objects and advantages of the various embodiments of the invention will be set forth in part in the description, or may be learned by practice of the invention. The objects and advantages of the embodiments of the invention will be realized and attained by means of the elements and combinations particularly pointed out in the appended claims. Embodiments of the invention are disclosed in the detailed description section and in the appended independent and dependent claims.

The various embodiments can include and/or exclude different aspects, features and/or advantages, where applicable. In addition, various embodiments can combine one or more aspects or features of other embodiments, where applicable.

It is understood that both the foregoing general description and the following detailed description are exemplary and explanatory only and are not restrictive of the embodiments of the invention, as claimed. The description of aspects, features and/or advantages of particular embodiments should not be construed as limiting other embodiments or the claims.

BRIEF DESCRIPTION OF THE DRAWINGS

The accompanying drawings, which arm incorporated in and constitute a part of this specification, illustrate several embodiments of the invention and together with the description, serve to explain the principles consistent with the present invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Within the concept of this specification, the terms used shall have their usual meaning in the context of the field of data processing unless defined otherwise. Particularly, a computer system broadly refers to any stand-alone computer, such as a personal computer (PC) or a laptop or a series of computers connected via a network, e.g., a network within a company, or a series of computers connected via the Internet. Computer systems and programs may be closely related. As used herein, phrases, such as "the computer provides" and "the program provides or performs specific actions," and "a user performs a specific action" are used to express actions by a computer system that may be controlled by a program or to express that the program or program module may be designed to enable the computer system to perform the specific action or to enable a user to perform the specific action by means of a computer system.

In this context, the term "automatically" is not intended to exclude a user's interactions with the computer system in the course of processing.

It should be understood that the term "presentment" as used herein, broadly refers to the specialized definition normally associated with commercial paper (i.e., the production on a negotiable instrument to a drawee) as well as to providing information via electronic means. For example, this electronic presentment may be through the use of an Internet—or intranet website or via e-mail or SMS, e.g., by making a web site accessible to one or more persons. Electronic presentment may also take place by sending computer readable storage media, like disks, ZIP disks, magneto-optical disks, CDs, R/W discs, DVD ROMs, etc., e.g., via standard mail.

The disclosed methods as described in the summary section may be implemented by means of a computer system and a computer software which allow the creation of software, like business software applications, and which allow the use of databases or database applications and Internet applications.

In computer systems or networks, the storing of "first data objects" like executable or non-executable files into non-volatile memory may be performed by a huge variety of software or software modules, hereinafter referred to collectively as data storage processor (DSP). Parallel to the DSP, a further module can run in the computer system waiting for such storing events. Such module is hereinafter referred to as event processor (EP). In order to detect such events, an EP may monitor the storing activity on the respective files. Alternatively, or in addition, the EP may receive a message from the DSP if the DSP has stored a first data object (file) via an interface. Such interface may be implemented in the form of a table, in which IDs or links or filenames of stored files are stored. If the EP recognizes a new event, e.g., by reading a new entry in the table, the EP may create, in a preferred embodiment, a second data object comprising data of the respective the first data object (file) like name, size, date, storage location, etc. The second data object may be customizable and may contain selected data of the file. The second data object preferably may comprise a link, preferably an ID, to the underlying data object and the type of the file (e.g., executable, non-executable, text, picture, HTML, etc.).

The EP then can pass via an interface the second data object to a further program module, which analyzes the files. The further module is hereinafter referred to as object processor (OP). The OP may comprise one or more sets of rules, by means of which it can be determined whether the file contains dangerous code. This may be done by means of a program like a virus scanner as is known from the state of the art. The applicable virus scanner may be selected by a rule which selects depending on the type of the file, which can be retrieved from the second data object. Additional data of the file may be retrieve from the database by means of the ID. An example of a simple rule is: "exe" files are analyzed by software A, "doc" files by software B, "jpeg" by software C, etc. A further set of rules may be a table containing code of known "dangerous software". The OP then uses this set of rules selects known dangerous code and analyzes the files for that code. As a further example of a rule, the code may also be assigned to specific file types. The rules and related data may be stored in the database.

After analyzing the files, the OP creates and/or may present a document (third data object) containing the results of the analysis, so that a system administrator or a user can have information regarding the security of the computer system/network. The third document may comprise the file names, in which dangerous code has been found, type of the dangerous code, storage location of the file, etc.

The second data objects may be collected in an object queue and processed in batch (e.g., over night, when the system load with online users is low). The OP may alternatively be activated by an event, i.e. by a storing process.

In computer systems and software for supporting business processes, the storing of data objects referring to business transactions into non-volatile memory (persisting) may be performed by one or more software modules (DSP). Such data object may be stored in a relational database system in the form of one or more lines in one or more tables. Parallel to the DSP, the EP runs in the computer system, waiting for such storing events. In order to detect such events, an EP may monitor the storing activity on the respective tables of the database. Alternatively, or in addition, the EP may receive a message from the DSP if the DSP has stored a data object via an interface. Such interface may be implemented in the form of a table, in which IDs of stored business transactions are stored. If the EP recognizes a new event, e.g., by reading a new entry in said table, the EP may create, in a preferred embodiment, the second data object comprising data of the respective business transaction, e.g. from the first data object. The second data object may be customizable and may contain selected data of the business transaction. The second data object preferably comprises a link, preferably an ID, to the underlying data object and the type of the underlying business transaction (e.g., Purchase Order or Invoice or type of the event (e.g., changed or created)).

The EP then may pass via an interface, the second data object to a further program module which calculates the costs of the respective business transaction. The further module is hereinafter referred to as object processor (OP). The OP may comprise one or more sets of rules, by means of which it can calculate the costs of the respective business transaction. The applicable rule may depend on the type of the business transaction, which can be retrieved from the second data object. Additional data of the business transaction may be retrieve from the database by means of the ID. An example of a simple rule is: The costs of a business transaction of the type "sending and invoice" to a customer in country X amount to $A*K(X)$, where A is a flat rate, and K is a factor depending on the country in which the receiver is located. The values and formulas, which make up the rules may be customized during installation.

Another rule for an other type of business transaction may for example be: The costs of a business transaction of the type "moving a material from production line 1 to production line 2" are to be calculated as fork-lift drives*distance (Pl1, Pl2)*Cost rate(fork-lift).

In an alternative embodiment, the OP uses templates, such as those disclosed in U.S. Pat. No. 6,308,166 B1, which document is herewith incorporated by reference. The OP then finds the appropriate sender and receiver costing objects by means of the appropriate rules and calculates the quantities and/or amounts that have to be assigned between the objects. After the calculation of the costs, the OP may create and/or post a costing document (third data object), so that costing information concerning the business transaction is available without any additional user interaction.

The second data objects may be collected in an object queue and processed in batch (e.g., over night, when the system load with online users is low). The OP may alternatively be activated for costing by an event, i.e., by a storing process. After processing or after posting the costs, the respective second data objects may be deleted. Alternatively or in addition, the underlying business transaction may be marked accordingly, i.e., that the corresponding costs have been posted.

Preferably, every business transaction (e.g., Create Purchase Order) in an ERP system has to trigger an event, that contains the key of the concerned Business Object (e.g., Purchase Order Number 4711).

In an alternative embodiment, the DSP may contain the functionality of the EP and may directly activate an OP for costing. In a software system SAP R/3 Release 4.0 (and following), provided by SAP AG (Walldorf, Germany), this may be implemented and realized via a Workflow tool. If relevant Business Objects exist, events may be triggered out of the concerned business transaction.

An EP can be registered for every event via a customizing table. In SAP-software the event handler may be realized via an ABAP function module. The business transaction causing the event is known in the EP. Via the key further information of the business transaction can be found (e.g., creating user of the purchase order and the cost center he/she is assigned to).

Through this information, the EP may first determine a customizable and dynamic business rule. "Dynamic" in this context means that values and sender and receiver objects need not be named but may be determined by means of formula or search mechanisms on the basis of the data of the business transaction. In a SAP system, these business rules can be realized with the "Template" disclosed in, for example, U.S. Pat. No. 6,308,166 B1 mentioned before. For example, for the event Purchase Order Create, it may find a rule "Costing of purchase order creation". These rules may be set up in advance and are useful to find the appropriate sender and receiver objects dynamically from the Business Object information.

They also may calculate quantities and/or amounts that have to be assigned between the costing object. For example, by using a template as disclosed in U.S. Pat. No. 8,308,166 B1, the rule "Costing of purchase order creation" can be set up the following:

ReceiverCostingObject=
ProfitabilitySegment(
Plant=PurhcaseOrder.Plant
CompanyCode=PurchaseOrder.CompanyCode)
SenderCostingObject=
CostCenterActivityType(
CostCenter=PurchaseOrder.Creator.CostCenter
ActivityType='MIN')
AssignedActivityTypeQuantity=5 min (average time for PO creation).

With this information a costing document can be created and the assigned cost can be posted. This doesn't require any further user interaction, once the business rules and event handling has been set up.

That way, the relevant cost information can be posted immediately. In the example above the posting of the overheads costs of the purchase department for the handling of a purchase order can be seen in Profitability Analysis on a very detailed level.

A further embodiment of the inventive method described in the summary section is characterized in that the method further comprises a step of (d) storing, after step (b) and before step (c), the second data object in a queue and passing the second data objects in the queue to the object processor at pre-settable times or time periods.

A further embodiment of the inventive method is characterized in that the method further comprises step (c) being executed immediately after step (b).

A further embodiment comprises selecting the applicable rules from the set of rules according to data contained in the second data object.

A further embodiment comprises selecting the data from the first data object and from the database according to the selected applicable rules.

A further embodiment is characterized in that the database contains master data about business processes and transactions, the first data object contains data of a business transaction, the second data object contains an ID of the first data object and data on the type of the business transaction, and wherein the object processor calculates overhead costs of the business transaction using the data and stores the overhead costs in the third data object.

A further embodiment comprises changing data contained in the second data object according to changes in the assigned first data object.

Processors suitable for the execution of a computer program may include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices (storage means) for storing data, e.g., magnetic, magneto-optical disks, or optical disks. Information carriers suitable for embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, embodiments consistent with the invention can be implemented on a computer system having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or haptic feedback, and input from the user can be received in any form, including acoustic, speech, or haptic input.

Reference will now be made in detail to the principles of the invention and its embodiments by an explanation on the basis of a data processing process, examples of which are illustrated in the accompanying drawings Referring now to FIG. 1, an exemplary computer system 101 is illustrated that comprises a computer 102 and operating means 103, 104, in accordance with an embodiment of the present invention. Those skilled in the art will appreciate that embodiments consistent with the present invention apply equally to any computer system, regardless of whether the computer system is a complicated multi-user computing apparatus or a single user device such as a personal computer or workstation.

Figure 1:
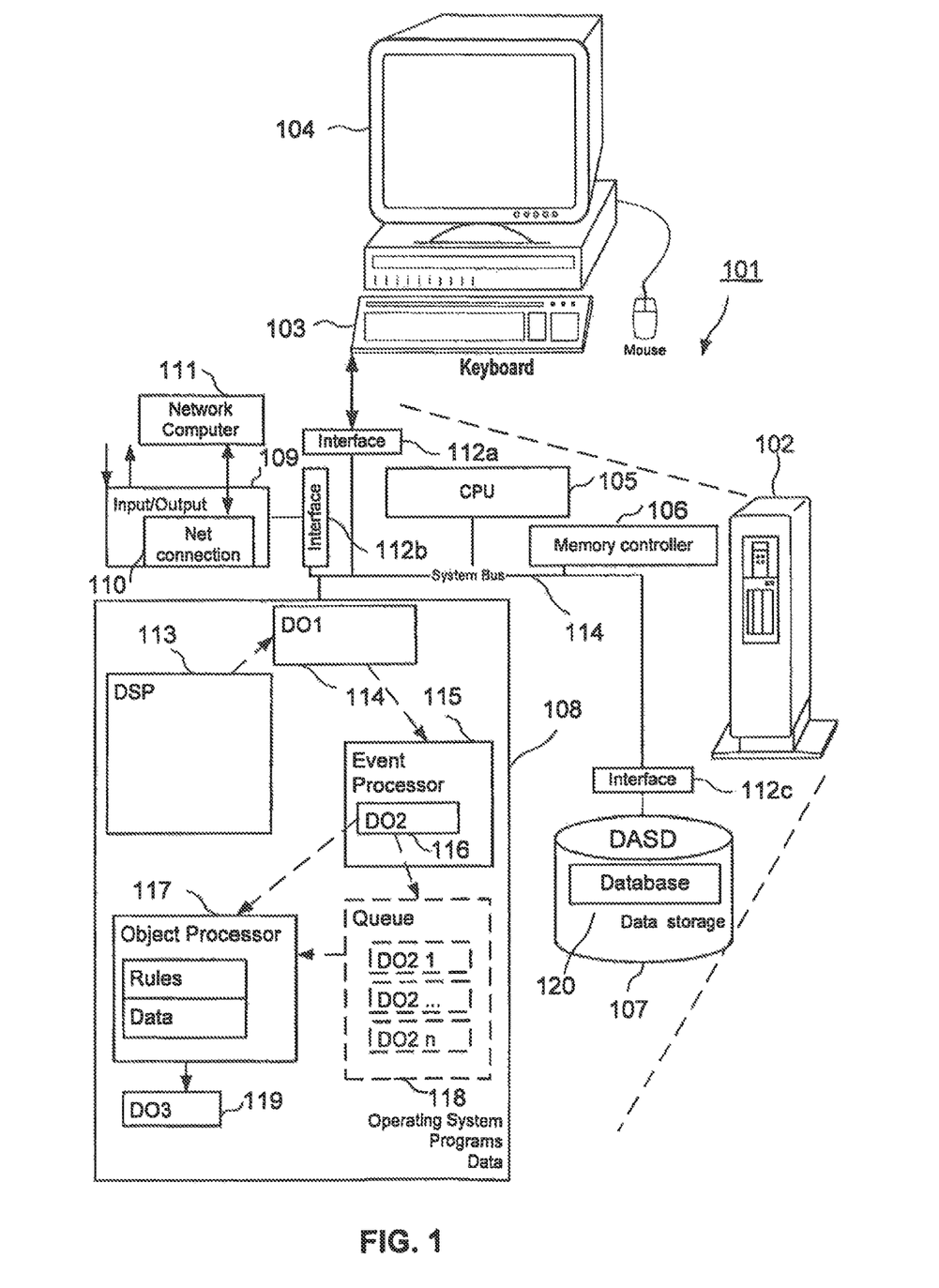
FIG. 1 is a block diagram for illustrating an exemplary computer system for implementing methods and embodiments consistent with the present invention.

As shown in FIG. 1, computer 102 may comprise a processor 105, a main memory 108, a memory controller 106, an auxiliary storage interface 112*c*, a general input/output interface 112*b* and a terminal interface 112*a*, all of which are interconnected via a system bus 114. Note that various modifications, additions, or deletions may be made to computer system 101 illustrated in FIG. 1 within the scope of the present invention, such as the addition of cache memory or other peripheral devices. FIG. 1 is presented to simply illustrate some of the salient features of computer system 101.

Processor 105 performs computation and control functions of computer system 101, and comprises a suitable central processing unit (CPU). Processor 105 may comprise a single integrated circuit, such as a microprocessor, or may comprise any suitable number of integrated circuit devices and/or circuit boards working in cooperation to accomplish the functions of a processor. Processor 105 may suitably execute (object-oriented) computer programs within main memory 108.

Auxiliary storage interface 112*c* allows computer system 101 to store and retrieve information from auxiliary storage devices, such as magnetic disk (e.g., hard disks or floppy diskettes) or optical storage devices (e.g., CD-ROM). One suitable storage device may be a direct access storage device (DASD) 107. As shown in FIG. 1, DASD 107 may be a hard disk drive which may read programs and data from a hard disk. It is important to note that while embodiments of the present invention have been (and will continue to be) described in the context of a fully functional computer system, those skilled in the art will appreciate that features consistent with the present invention are capable of being distributed as a program product in a variety of forms, and that embodiments of the present invention apply equally regardless of the particular type of signal bearing media to actually carry out the distribution. Further examples of signal beating media include: recordable type media such as floppy disks and CD ROMS, and transmission type media, such as digital and analog communication links, including wireless communication links.

Memory controller 106, through use of a processor is responsible for moving requested information from main memory 108 and/or through auxiliary storage interface 112*c* to processor 105. While for the purposes of explanation, memory controller 106 is shown as a separate entity, those skilled in the art understand that, in practice, portions of the function provided by memory controller 106 may actually reside in the circuitry associated with processor 105, main memory 108, and/or auxiliary storage interface 112*c*.

Terminal interface 112*a* allows system administrators and computer programmers to communicate with computer system 101, normally through monitor 104, keyboard 103, mouse, trackball and the like or through programmable workstations. Although the system 101 depicted in FIG. 1 contains only a single main processor 105 and a single system bus 114, it should be understood that embodiments of the present invention apply equally to computer systems having multiple processors and multiple system buses. Similarly, although the system bus 114 of the preferred embodiment is a typical hardwired, multi-drop bus, any connection means that supports directional communication in a computer-related environment could be used.

Input/output interface 112*b* allows computer system 101 via processor 105 to communicate with general input/output means 109, including a net connection 110, for sending and/or receiving data, e.g., for a net connection with one or more further computer systems 111, or for sending or receiving of data to or from other parties. A plurality of computer systems like computer system 101, can be connected via the net connection 110 in the form of a network. In such a case, the network computers 111 can be used as further input/output means, including the use as further storage locations.

In a preferred embodiment, memory 108 suitably includes an operating system, programs and data, particularly a data storage processor (DSP) 113, an interface 114, an event processor 115 comprising a second data object 116, an object processor 117 comprising rules and data and a third data object 119. In an alternative embodiment, memory 108 includes additionally a queue processor 118 comprising n second data objects 116. A database 120 is available in DASD storage 107. Preferably, database 120 may be a relational database.

It should be understood that for purposes of this application, memory 108 used in its broadest sense, and can include Dynamic Random Access Memory (DRAM), Static RAM (SRAM), flash memory, cache memory, etc. While not explicitly shown in FIG. 1, memory 108 may be a single type of memory component or may be composed of many different types of memory components. For example, memory 108 and CPU 105 may be distributed across several different computers that collectively comprise system 101. It should also be understood that programs in memory 108 can include any and all forms of computer programs, including source code, intermediate code, machine code, and any other representation of a computer program.

The operating system provides the basic functionality that controls the computer system 101. Operating system can comprise any suitable operating system, such as IBM's OS/400, OS/2, Microsoft's Windows, Java and the various versions of UNIX. The relational database 124 provides the mechanism for persistently storing object data in the computer system 101, and can be any suitable relational database, such as those available from IBM, Oracle or Microsoft.

DSP 113 can be any application that stores the data in a data storage means. Interface 114 contains information that a first data object has been stored in the database 120. In the example of FIG. 1, a first data object DO1 has been stored. At run-time, EP 115 reads in interface 114 that a first data object DO1 has been persisted in the database 120 and creates second data object DO2 116. Information contained in DO2 116 can be retrieved in database 120. Subsequently, EP 115 passes the DO2 116 to the Object Processor 117. OP 117 uses the information contained in DO2 116, determines the rules and data and creates a third data object 119 (DO3).

In a preferred embodiment, the first data object DO1 relates to a business transaction and the rules are applicable to calculate the costs of the business transaction underlying DO1. OP 117 then calculates this costs and creates a third data object 119 (DO3), which contains the costs and further information for posting these costs. OP 117 may alternatively or in addition post the costs in the respective booking system.

In a further embodiment, EP 115 may pass the DO2 116 not to OP 117 but to queue processor (QP) 118. QP 118 then may pass the DO2*s* 116 at pre-settable times or time intervals in whole or in part to OP 117 for the further processing pointed out above.

Those skilled in the art will appreciate that more than one of the mentioned processors may work in parallel in a computer system.

Figure 2:
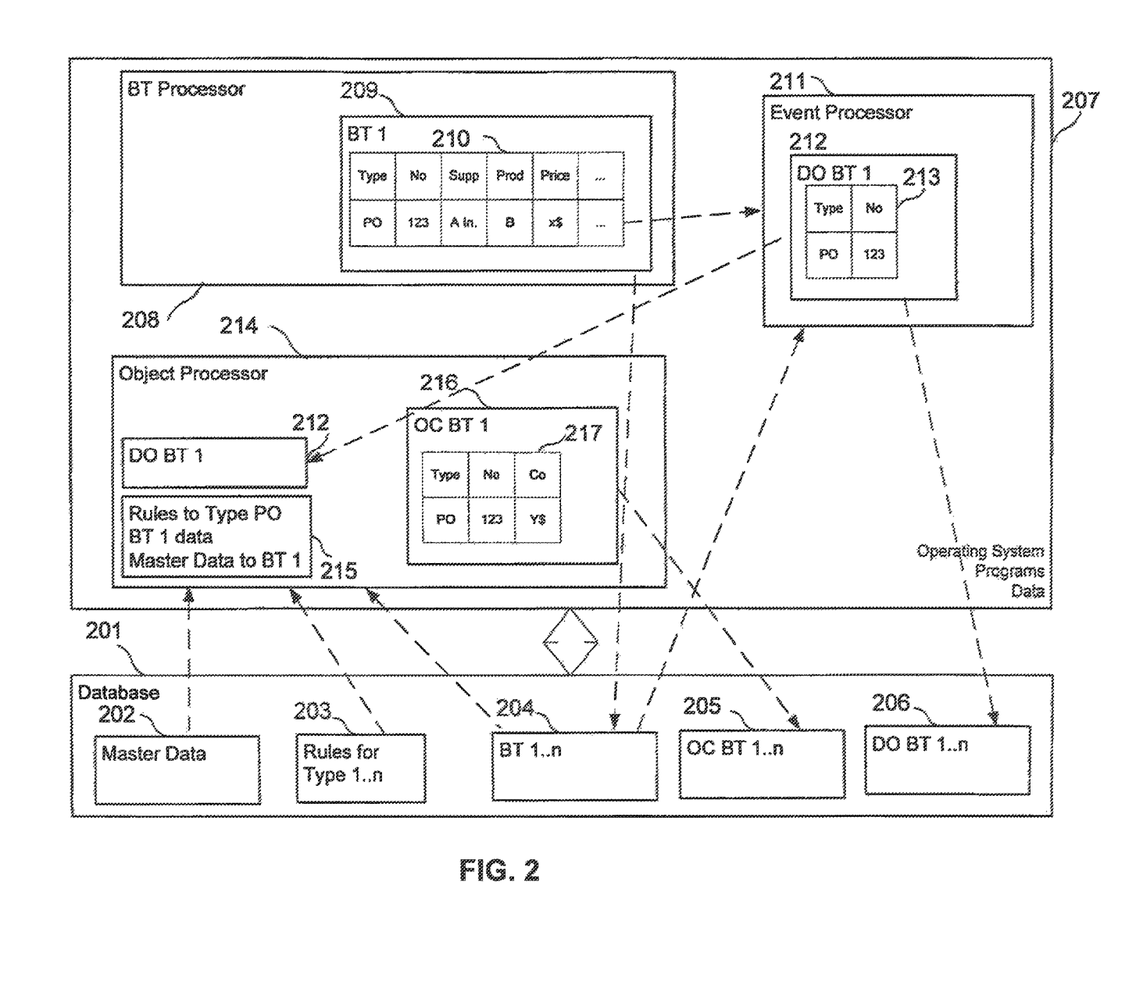
FIG. 2 shows for illustration an example of possible interactions between program modules and data according to an embodiment of the invention.

Referring now to FIG. 2, a further embodiment of the invention is illustrated by a main memory 207 and a database 201 of a computer system like the one shown in FIG. 1. Main memory 207 may comprise as data storage processor a business transaction processor 208. BT processor 208 may be any application, which stores data of a business transaction in a relational database 201. Main memory 207 may further comprise an event processor 211 and an object processor 214. Database 201 comprises a relational database system including tables 202 for master data, tables 203 may comprise rules for business transactions of type 1 to n, tables 204 for the data of the business transactions 1 to n, tables 205 for the overhead costs of business transactions 1 to n, and tables 206 for the second data objects referring to business transactions 1 to n. During run-time, processor 208 processes a first data object 209 of a business transaction BT 1. First data object 209 is implemented, in the example, as a line of a table 210. As can be seen from FIG. 2, business transaction BT 1 can be of type purchase order, has the ID 123 and refers to the purchase of a product B from a supplier A. Inc for a prize of X $. Further columns may be available although not shown. Processor 208 stores first data object 209 in the tables 204 and passes the information that a new business transaction has been persisted in the database 201 to event processor 211. The event processor 211 creates a new second data object 212 from the business transaction data. Second data object 212 may be implemented as a line of a table 213 comprising two fields, one for the type of the business transaction and one for the ID. Event processor 211 passes second data object 212 to the object processor 214. The created second data objects 212 may also be stored in tables 208 of the database 201. Depending on the type of the business transaction, processor 214 retrieves respective master data, applicable rules and, if necessary, further data of the business transaction BT 1 from tables 202, 203 and 204 from the database 201. Processor 214 then calculates the (overhead) costs of business transaction BT 1 by applying the rules on the retrieved data and creates a third data object 216 comprising this costing information. The third data object 216 may be implemented as a line of a table 217 having a field for the type, the ID and the costs, respectively. The calculated costs may be automatically and directly posted in to the bookkeeping system, what is indicated by storing the third data object 216 in to tables 205. Alternatively or in parallel, the third data objects 216 may be stored in separate tables as well.

Figure 3:
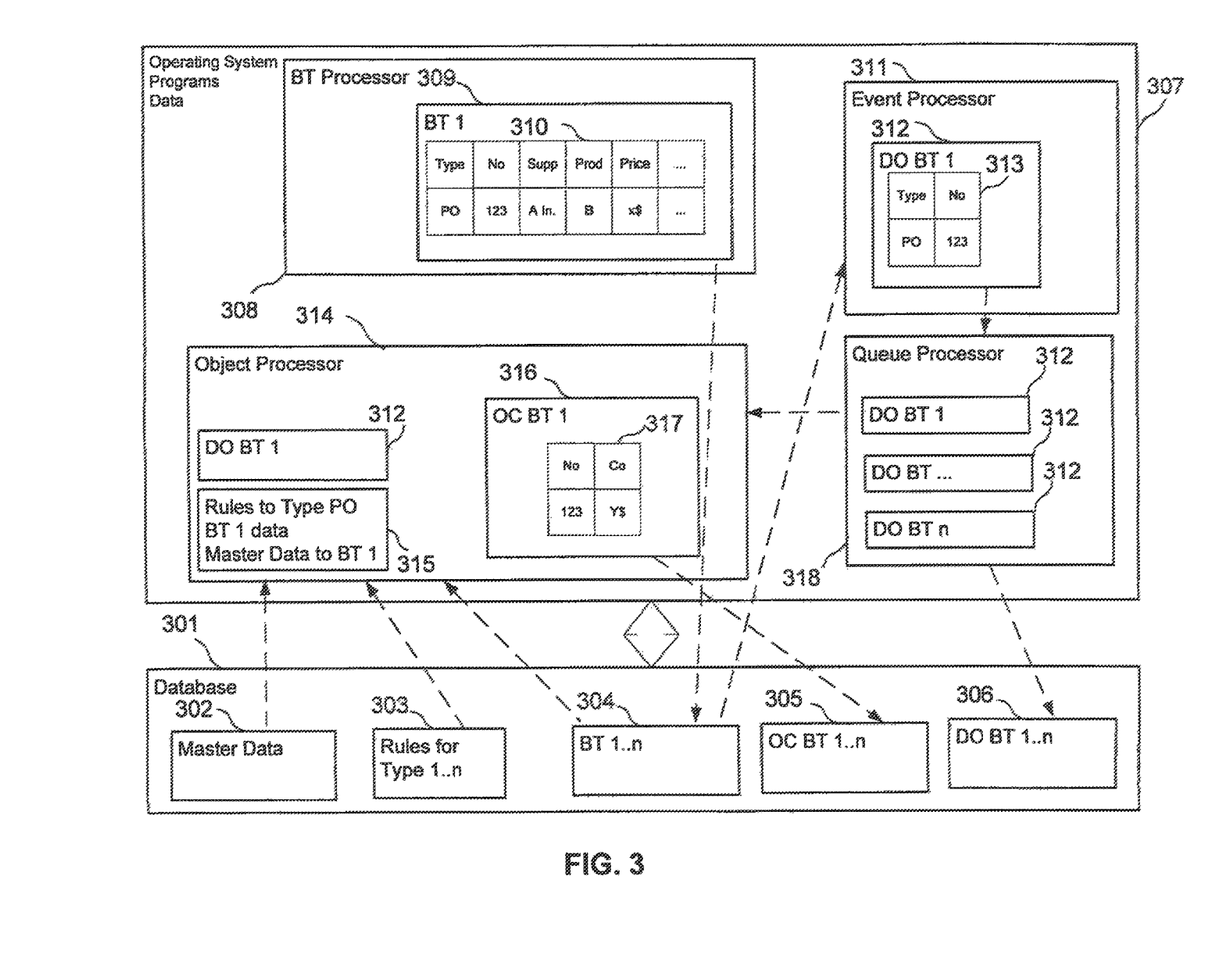
FIG. 3 shows for illustration an example of possible interactions between program modules and data according to a further embodiment of the invention.

Referring now to FIG. 3, another embodiment of the invention is illustrated by a main memory 307 and a database 301 of a computer system like the one shown in FIG. 1. Main memory 307 comprises a business transaction processor 308, an event processor 311 and an object processor 314. Database 301 comprises a relational database system including tables 302 for master data, tables 303 comprising rules for business transactions of type 1 to n, tables 304 for the data of the business transactions 1 to n, tables 305 for the overhead costs of business transactions 1 to n, and tables 306 for the second data objects referring to business transactions 1 to n. During run-time, processor 308 processes a first data object 309 of a business transaction BT 1. First data object 309 may be implemented, as in the example, as a line of a table 310. As can be seen from FIG. 3, business transaction BT 1 can be of type purchase order, has the ID 123 and refers to the purchase of a product B from a supplier A Inc for a prize of X $. Further columns may be available although not shown. Processor 308 stores first data object 309 in the tables 304 and passes an information that a new business transaction has been persisted in the database 201 to event processor 311. The event processor 311 creates a new second data object 312 from the data of each business transaction he is been informed. Second data object 312 may be implemented as a line of a table 313 comprising two fields, one for the type of the business transaction and one for the ID. Event processor 311 passes second data object 312 to the queue processor 318. Queue processor 318 passes the second data objects 312 at pre-settable times or time intervals to the object processor 314 for further processing. Queue processor 318 may also store the second data objects 312 in one or more tables 306, which may be passed to or read by object processor 314 at pre-settable times or time intervals. Depending on the type of the business transaction, processor 314 then retrieves respective master data, applicable rules and, if necessary, further data of the business transaction BT 1 from tables 302, 303 and 304 from the database 301. Processor 314 then calculates the (overhead) costs of business transaction BT 1 by applying the rules on the retrieved data and creates a further data object 316 comprising this costing information. Data object 316 may be implemented as a line of a table 317 having a field for the ID and the costs, respectively. The calculated costs may be automatically and directly posted into the bookkeeping system, what is indicated by storing the data object 316 in to tables 305. Alternatively or in parallel, the data objects 316 may be stored in separate tables as well.

Figures 4A, 4B:
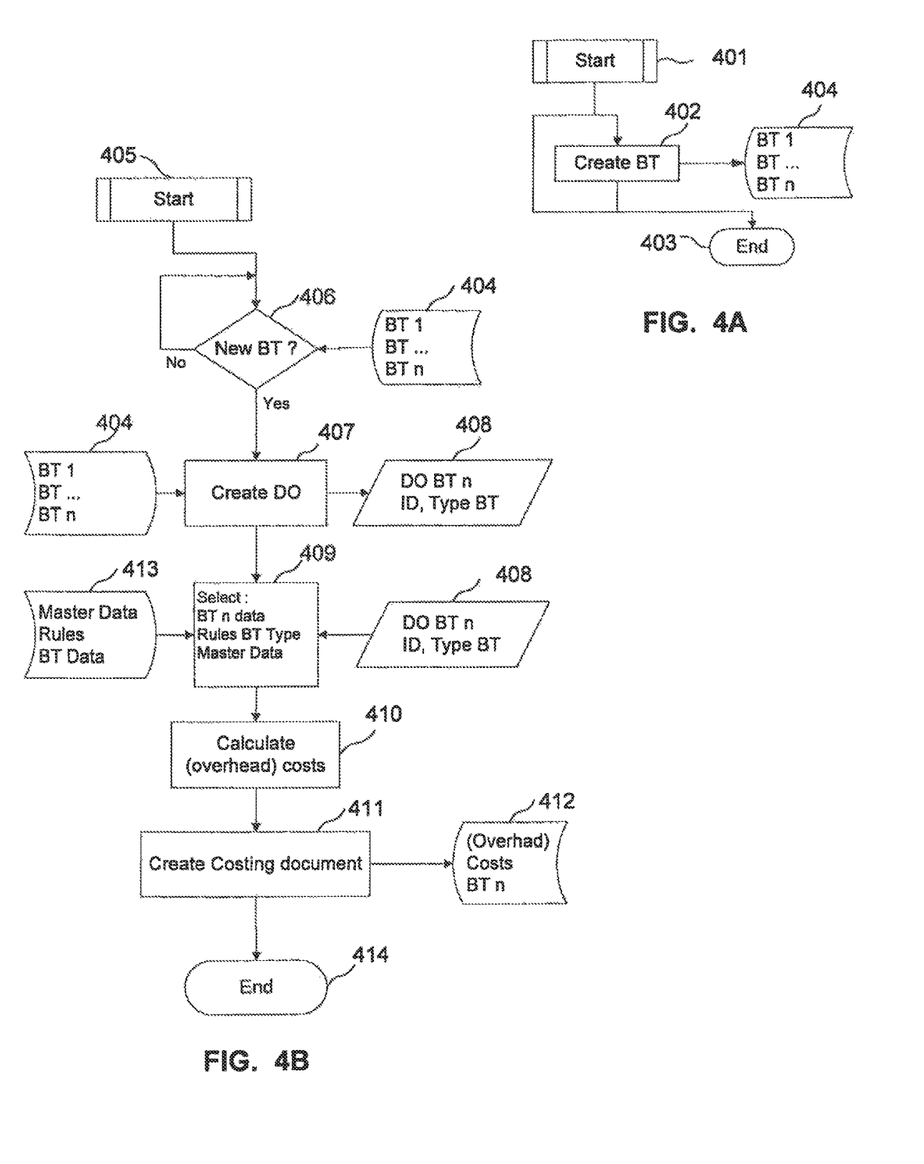
FIGS. 4A and 4B are flow diagrams for illustrating exemplary methods according to embodiments of the invention.

Referring now to FIGS. 4A and 4B, two flow diagrams are illustrated in accordance with embodiments of the present invention. In FIG. 4A, a first flow diagram is provided that describes a first process, which comprises, after a starting step 401, a step 402 in which the creation of a data objects according to business transactions BT 1 to n, and storing such data objects in a database 404. Step 402 may be executed repeatedly, depending on the number of the business transactions. This first process may end in a step 403.

In FIG. 4B, a second flow diagram is illustrated that describes a second process, which comprises, after a starting step 405, a step 406 for querying database 404 whether a new business transaction has been persisted. In case there is, a second data object 408 is created in a step 407. Second data object 408 may include information on the type of the business transaction and its ID. This data is retrieved from database 404. In a next step 409, rules, business transaction (BT) data and/or master data referring to new business transaction are selected from a further database 413 for calculating the (overhead) costs of the business transaction. The rules and business transaction data to be selected depend on the type of the business transaction. They are established during installation and/or customization of the software. In step 410, the costs (e.g., overhead costs) are calculated by using the rules and data retrieved from the further database 413. In a step 411, a costing document 412 is created. Costing document 412 may include a reference (e.g., the ID) to a business transaction and the costs (e.g., overhead costs) of the referenced business transaction. Costing document 412 may be used by other processes running in the system for immediate or delayed booking. The process then ends in a step 414.

Figure 5:
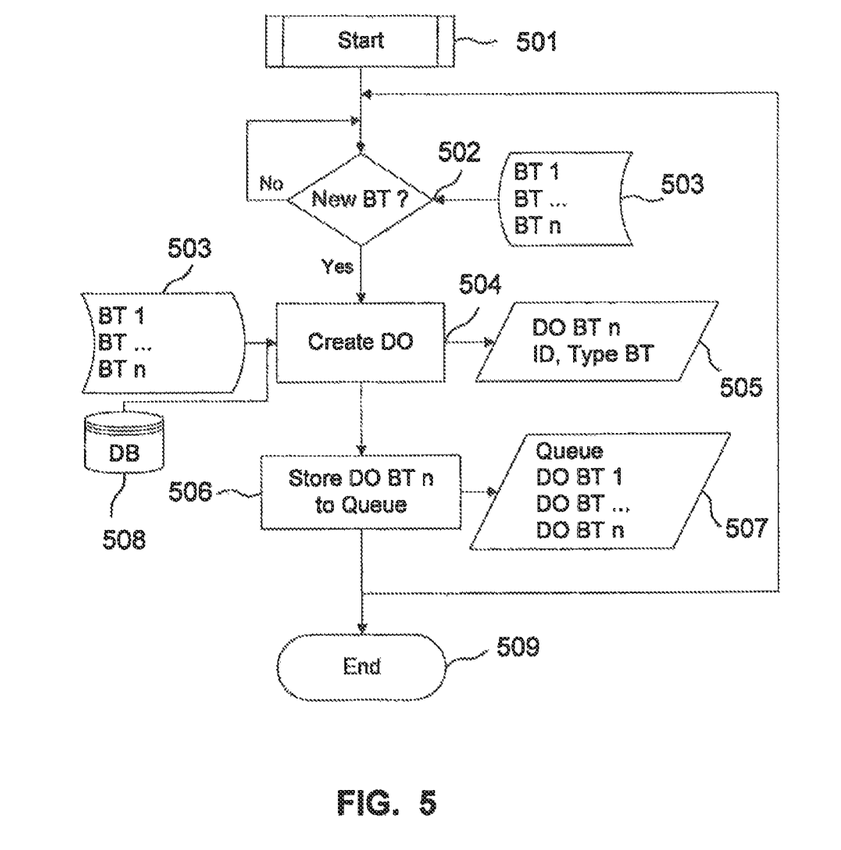
FIG. 5 is a flow diagram for illustrating a further exemplary method according to an embodiment of the invention.

Referring now to FIG. 5, another flow diagram is provided for illustrating a further exemplary method consistent with an embodiment of the present invention. This flow diagram describes a further process, which comprises, after a starting step 501, a step 502 for querying an interface 503 whether one or more new business transactions BT 1 to n have been persisted in a database. In case of yes, second data objects 505 are created for each of the new business transactions in a step 504. Second data objects 505 includes information on the type of the respective business transaction and a reference to the complete first data object of the respective business transaction, e.g., its identifier (ID). This data is retrieved from the information contained in interface 503 and from a database 508. For example, interface 503 may only include the ID of the business transactions and the type of the respective business transaction is then retrieved from database 508 by querying the complete first data object of the business transaction referenced by the ID. In next step 506, 1 to n second data objects 505 are stored in a queue 507. Queue 507 may be implemented as a file or as an independent process, which imports these second data objects via an interface. The process then may pull back to step 502 or end in a step 508.

Figure 6:
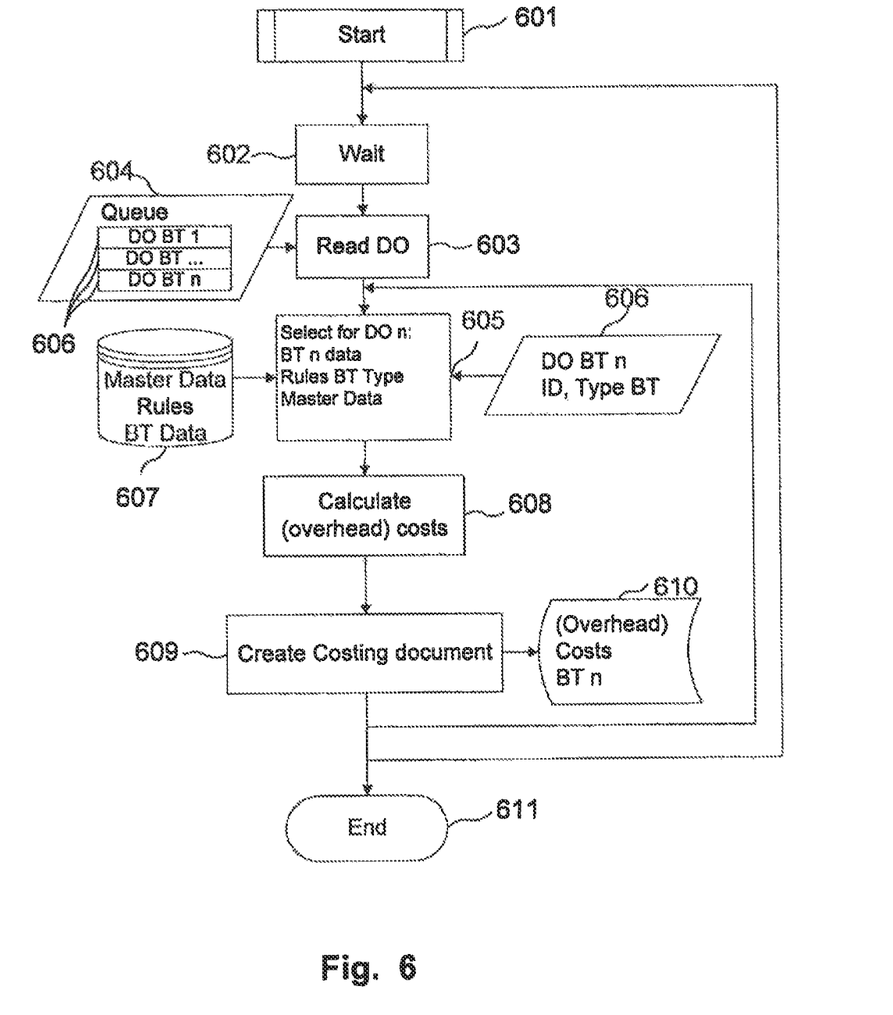
FIG. 6 is a flow diagram for illustrating a still further exemplary method according to an embodiment of the invention.

Referring now to FIG. 6, a flow diagram is provided for illustrating another exemplary method in accordance with a still embodiment of the present invention. This flow diagram describes a further process, which comprises, after a starting step 601, a waiting step 602 in which the process waits a pre-settable time interval or for a pre-settable time. Alternatively, the process may be started at a pre-settable time. At the selected time, one or more second data objects 606 are imported from a queue object 604 in a step 603. These objects 606 are then processed consecutively.

Second data object 606 may include information on the type of the business transaction and its ID. In a subsequent step 605, rules, business transaction data and master data referring to new business transaction are selected from a database 607 for calculating the costs (e.g., overhead costs) of the business transaction. The rules and business transaction data to be selected depend on the type of the business transaction. They may be established during installation and/or customization of the software and databases. In step 608, the (overhead) costs are calculated by using the rules and data retrieved from the database 607. In a step 609, a costing document 610 is created. Costing document 610 may include a reference (e.g., the ID) to a business transaction and the (overhead) costs of the referenced business transaction. Costing document 610 may be used by other processes running in the system for immediate or delayed booking. The process then ends in a step 611.

Modifications and adaptations of embodiments of the present invention will be apparent to those skilled in the art from consideration of the specification and practice of embodiments of the invention disclosed herein. The foregoing description of an implementation of the invention has been presented for purposes of illustration and description. It is not exhaustive and does not limit the invention to the precise form disclosed. Modifications and variations are possible in light of the above teachings or may be acquired from the practicing of the invention. For example, the described implementation includes software, but systems and methods consistent with the present invention may be implemented as a combination of hardware and software or in hardware alone. Additionally, although aspects of the present invention are described for being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM.

Computer programs based on the written description and flow charts of this invention are within the skill of an experienced developer. The various programs or program modules can be created using any of the techniques known to one skilled in the art or can be designed in connection with existing software. For example, programs or program modules can be designed in or by means of Java, C++, HTML, XML, or HTML with included Java applets or in SAP R/3 or ABAP. One or more of such modules can be integrated in existing e-mail or browser software.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

While specific embodiments of the invention have been described herein, it will be appreciated that embodiments consistent with the invention may be practiced otherwise than as described. Furthermore, the description is not intended to limit the invention. For example, the order of steps to be performed to implement methods consistent with the present invention is not limited to the order described herein or prescribed in the claims.

Other embodiments of the invention will be apparent to those skilled in the art from consideration of the specification and practice of embodiments of the invention disclosed herein. It is intended, therefore, that the specification and examples be considered as exemplary only, with a true scope and spirit of the invention being indicated by the following claims.

What is claimed is:

1. A method of processing data objects in a computer system that processes business transactions, the data objects comprising data representing the transactions, the method comprising:
   waiting for storing events to occur in the computer system, each of the storing events representing occurrence of a corresponding business transaction;
   in response to a first data object being stored in a memory device, the first data object comprising data representing a first transaction, creating a second data object comprising data of the first data object, the creation of the second data object being event based and triggered by the storing of the first data object;
   retrieving a type of the first transaction from the second data object;
   selecting a first rule from a set of one or more rules based on the type of the first transaction;
   calculating a cost of the first transaction by applying the selected first rule to at least one of the data of the first data object and the data of the second data object; and
   creating a third data object comprising the cost;
   wherein the method is performed automatically, triggered by an event of the first transaction without requiring any user interaction, wherein the triggering event is persisting of the first data object as part of storing the first data object, wherein the method comprises an asynchronous and accurate assignment of costs, and reduces computing time and memory space for running a period-end closing of an enterprise's business software and computer system.

2. The method of claim 1, further comprising storing the second data object in a queue and passing the second data object in the queue to an object processor at a pre-settable time.

3. The method of claim 1, wherein the third data object is created after the second data object is created.

4. The method of claim 1, further comprising selecting applicable rules from the set of rules according to data contained in the second data object.

5. The method of claim 4, further comprising selecting the data from the first data object according to the selected applicable rules.

6. The method of claim 1, wherein
   a database contains master data about processes and the transactions,
   the first data object contains data of the first transaction,
   the second data object contains an identifier of the first data object and data on the type of the first transaction, and
   the cost of the first transaction is calculated using at least one of the data contained in the first data object, the data contained in the second data object, and the master data, and the cost is stored in the third data object.

7. The method of claim 1, further comprising changing the data contained in the second data object according to changes in the first data object.

8. The method of claim 1, wherein the first transaction is a business transaction.

9. The method of claim 1, wherein the cost is an overhead cost.

10. A computer system for processing data objects, the data objects comprising data representing transactions processed in the computer system, the system comprising:
a memory device storing instructions;
at least one processor that, when executing the instructions, is configured to perform a method in which the processor will:
wait for storing events to occur in the computer system, each of the storing events representing occurrence of a corresponding business transaction;
store a first data object, the first data object comprising data representing a first transaction;
in response to the first data object being stored, create a second data object comprising data of the first data object, the creation of the second data object being event based and triggered by the storing of the first data object;
retrieve a type of the first transaction from the second data object;
select a first rule from a set of one or more rules based on the type of the first transaction;
calculate a cost of the first transaction by applying the selected first rule to at least one of the data of the first data object and the data of the second data object; and
create a third data object comprising the cost;
wherein the method is performed automatically, triggered by an event of the first transaction without requiring any user interaction, wherein the triggering event is persisting of the first data object as part of storing the first data object, wherein the method comprises an asynchronous and accurate assignment of costs, and reduces computing time and memory space for running a period-end closing of an enterprise's business software and computer system.

11. The computer system of claim 10, wherein the at least one processor is further configured to
store the second data object in a queue and pass the second data object in the queue to an object processor at a pre-settable time.

12. The computer system of claim 10, wherein the third data object is created after the second data object is created.

13. The computer system of claim 10, wherein the at least one processor is further configured to select applicable rules from the set of rules according to the data contained in the second data object.

14. The computer system of claim 13, wherein the at least one processor is further configured to select the data from the first data object according to the selected applicable rules.

15. The computer system of claim 10, wherein
a database contains master data about processes and the transactions,
the first data object contains data of the first transaction,
the second data object contains an identifier of the first data object and data on the type of the first transaction, and
the cost of the first transaction is calculated using at least one of the data contained in the first data object, the data contained in the second data object, and the master data, and the cost is stored in the third data object.

16. The computer system of claim 10, wherein the at least one processor is further configured to change the data contained in the second data object according to changes in the first data object.

17. The computer system of claim 10, wherein the first transaction is a business transaction.

18. The computer system of claim 10, wherein the cost is an overhead cost.

19. A non-transitory computer readable medium storing instructions that, when executed by at least one processor, perform a method of processing data objects in a computer system, the data objects comprising data representing transactions processed in the computer system, the method comprising:
waiting for storing events to occur in the computer system, each of the storing events representing occurrence of a corresponding business transaction;
in response to a first data object being stored in a memory device, the first data object representing a first transaction, creating a second data object comprising data of the first data object, the creation of the second data object being event based and triggered by the storing of the first data object;
retrieving a type of the first transaction from the second data object;
selecting a first rule from a set of one or more rules based on the type of the first transaction;
calculating a cost of the first transaction by applying the selected first rule to at least one of the data of the first data object and the data of the second data object; and
creating a third data object comprising the cost;
wherein the method is performed automatically, triggered by an event of the first transaction without requiring any user interaction, wherein the triggering event is persisting of the first data object as part of storing the first data object, wherein the method comprises an asynchronous and accurate assignment of costs, and reduces computing time and memory space for running a period-end closing of an enterprise's business software and computer system.

20. The non-transitory computer-readable medium of claim 19, the method further comprising storing the second data object in a queue and passing the second data object in the queue to an object processor at a pre-settable time.

* * * * *